US012785952B2

(12) United States Patent
Kang et al.

(10) Patent No.: US 12,785,952 B2
(45) Date of Patent: Nov. 3, 2026

(54) DISTRIBUTED DEVICE AND KEY MANAGEMENT SYSTEM

(71) Applicant: ICTK Co., Ltd., Seongnam-si (KR)

(72) Inventors: Bong Ho Kang, Seoul (KR); Won Seok Shin, Gyeonggi-do (KR); Hyoung Sub Shim, Seoul (KR)

(73) Assignee: ICTK Co., Ltd., Seoul (KR)

( * ) Notice: Subject to any disclaimer, the term of this patent is extended or adjusted under 35 U.S.C. 154(b) by 31 days.

(21) Appl. No.: 18/811,954

(22) Filed: Aug. 22, 2024

(65) Prior Publication Data

US 2025/0070966 A1 Feb. 27, 2025

(30) Foreign Application Priority Data

Aug. 24, 2023 (KR) ........................ 10-2023-0111000

(51) Int. Cl.
*H04L 9/08* (2006.01)
*H04L 9/00* (2022.01)
*H04L 9/32* (2006.01)

(52) U.S. Cl.
CPC .......... *H04L 9/0866* (2013.01); *H04L 9/3278* (2013.01); *H04L 9/50* (2022.05)

(58) Field of Classification Search
CPC ........ H04L 9/0866; H04L 9/50; H04L 9/3278
USPC .......................................................... 713/171
See application file for complete search history.

(56) References Cited

U.S. PATENT DOCUMENTS

| | | | | |
|---|---|---|---|---|
| 10,958,451 | B2 * | 3/2021 | Kim | H04W 12/06 |
| 11,252,138 | B2 * | 2/2022 | Gupta | H04L 9/3239 |
| 2017/0134176 | A1 * | 5/2017 | Kim | H04W 12/06 |
| 2020/0244632 | A1 * | 7/2020 | Gupta | G06F 21/606 |
| 2021/0056547 | A1 * | 2/2021 | Monica | G06Q 20/3672 |
| 2022/0029801 | A1 * | 1/2022 | Velagapalli | H04L 9/0877 |

* cited by examiner

*Primary Examiner* — Teshome Hailu

(57) ABSTRACT

Provided are a distributed device and a distributed key management system.

20 Claims, 7 Drawing Sheets

DISTRIBUTED DEVICE AND KEY MANAGEMENT SYSTEM

CROSS-REFERENCE TO RELATED APPLICATION

This application claims the benefit of priority of Korean Patent Application No. 2023-0111000, filed on Aug. 24, 2023, the contents of which are incorporated by reference as if fully set forth herein in their entirety.

FIELD AND BACKGROUND OF THE INVENTION

1. Field of the Invention

The present invention relates to a distributed device and a key management system.

2. Discussion of Related Art

"Blockchain" refers to a data management technology in which continuously increasing data is recorded in blocks of specific units and blockchain nodes constituting a peer-to-peer (P2P) network manage the blocks as a chain-like data structure, or to the data structure. The blockchain technology may ensure the integrity and security of transactions through a consensus process in which all blockchain nodes in the network record and verify the transactions.

However, according to a blockchain-based key management system, keys or certificates of all blockchain nodes are concentrated in one key management system. Accordingly, when the key management system is attacked externally, there is a risk that the keys and certificates of all the blockchain nodes will be deleted or leaked and the entire blockchain network will be disabled.

In this way, the conventional hardware security module (HSM)/key management system (KMS) is configured in a centralized manner. Accordingly, when the KMS/HSM, which is the source of key-based security, is hacked, the entire security is at risk of being compromised.

Therefore, demands for a new key management system are increasing to improve security and management efficiency.

SUMMARY OF THE INVENTION

The present invention is directed to providing a distributed device and key management system that are not in a structure in which a master key, a hardware security module (HSM), and a key management system (KMS) are present in only one system or a single node but in a structure in which each node or distributed device has a blockchain client while performing an HSM/KMS function and thus constitutes a blockchain while serving as an independent node.

The present invention is also directed to providing a distributed device and key management system in which nodes are connected to each other through an interface (e.g., a peripheral component interconnect (PCI) interface) and also protection from attacks is enhanced with security based on a physically unclonable function (PUF) chip and secured connections such as transport layer security (TLS) connections or datagram transport layer security (DTLS) connections.

The present invention is also directed to providing an inexpensive and highly reliable distributed device and key management system which do not cause independent nodes or distributed devices to operate in a centralized manner, allow the entire cryptographic system to keep operating even when one node is attacked or out of order, and thus lower the risk of hacked one node.

Objects to be achieved by embodiments of the present invention are not limited thereto, and solutions described below and purposes or effects that may be found in embodiments may also be included in the objects.

According to an aspect of the present invention, there is provided a distributed device including a hardware security device configured to generate a key, a key management module configured to manage the generated key, and a blockchain client configured to receive the generated key from the key management module and share the generated key in a blockchain (or blockchain network). The hardware security device includes a PUF module including a PUF, and the generated key is generated by the PUF module.

The PUF may include an encryption/decryption engine configured to generate an asymmetric key, and the PUF module may include a plurality of PUFs.

At least some of the plurality of PUFs may generate a master key.

The hardware security device may manage the master key for encrypting data.

The hardware security device may include a PCI interface.

The hardware security device may generate a PUF-based key for an encryption-demanding service as a response key.

The blockchain client may share the response key in the blockchain network.

The response key may be registered in the blockchain network when integrity is verified in the blockchain network.

The blockchain client may provide the response key to a device that receives the encryption-demanding service.

The distributed device may further include a communicator configured to perform secured communication with another device on the basis of the response key.

The key management module may perform encryption and decryption.

When a duplicate key is generated by the hardware security device, the key management module may delete the duplicate key.

The distributed device may further include a monitoring part configured to manage whether another device in the blockchain network malfunctions.

According to another aspect of the present invention, there is provided a distributed key management system including a first distributed device and a second distributed device included in a blockchain network. When an encryption-demanding service is received, the second distributed device may request a PUF-based key from the first distributed device.

The first distributed device may generate a response key corresponding to the requested key and share the response key in the blockchain network.

The response key may be registered in the blockchain network when integrity is verified in the blockchain network.

Each of the first distributed device and the second distributed device may include a hardware security device configured to generate a key, a key management module configured to manage the generated key, and a blockchain client configured to receive the generated key from the key management module and share the generated key in the blockchain (or blockchain network). The hardware security device may include a PUF module including PUFs, and the generated key is generated by the PUF module.

According to another aspect of the present invention, there is provided a distributed key management system including a first distributed device and a second distributed device included in a blockchain network and a monitoring server configured to monitor the first distributed device and the second distributed device. The monitoring server provides information on a normal one of the first distributed device and the second distributed device to a distributed device that receives an encryption-demanding service.

The normal distributed device may generate a PUF-based response key corresponding to a key request for the encryption-demanding service.

The normal distributed device may provide the response key to the distributed device that receives the encryption-demanding service.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
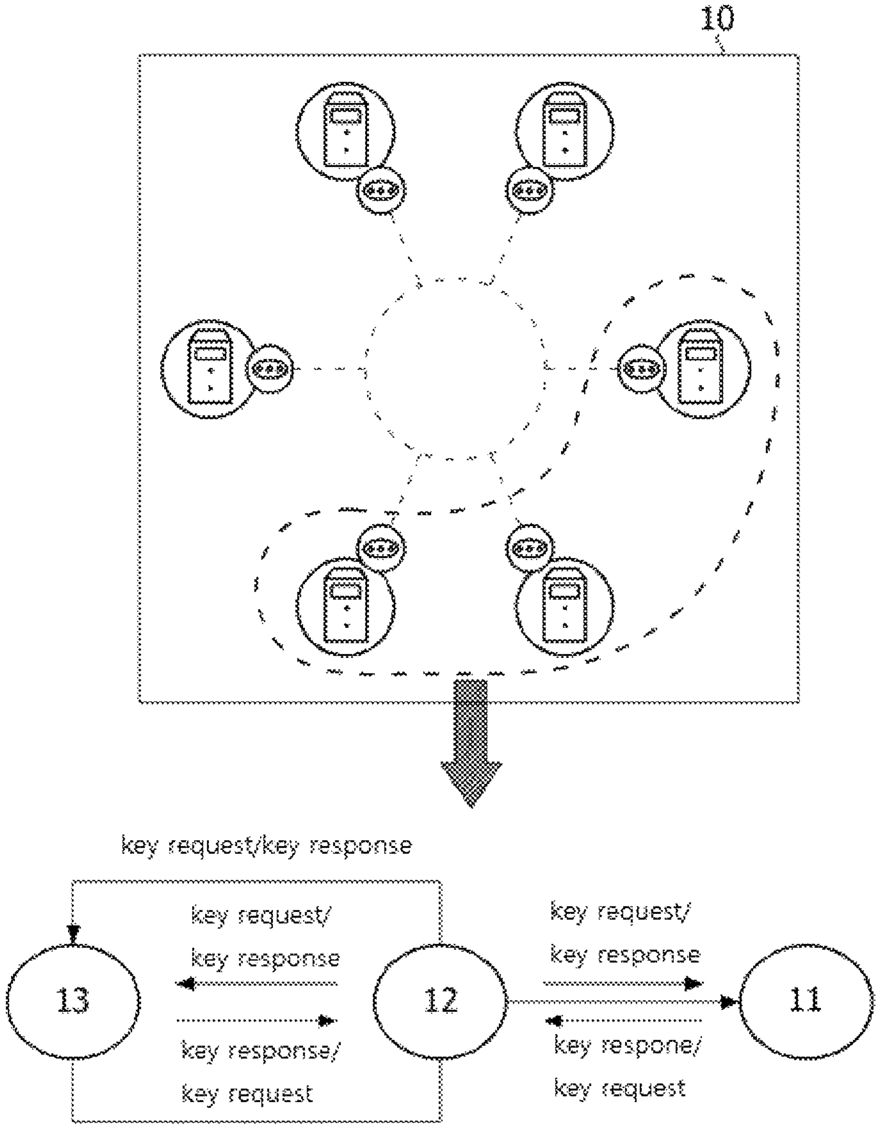
FIG. 1 is a conceptual diagram of a key management system according to an exemplary embodiment.

Since the present invention can be variously modified and have several embodiments, specific embodiments will be illustrated in the drawings and described. However, this is not intended to limit the present invention to the specific embodiments, and it is to be understood that the present invention includes all modifications, equivalents, and substitutions within the spirit and technical scope of the present invention.

Terms including ordinal numbers, such as "second," "first," and the like, may be used for describing various components, but the components are not limited by the terms. The terms are only used for the purpose of distinguishing one component from another. For example, a second component may be named a first component without departing from the scope of the present invention, and a first component may likewise be named a second component. The term "and/or" includes any one or a combination of a plurality of related stated items.

When a first component is referred to as being "connected" or "coupled" to a second component, the first component may be directly connected or coupled to the second component, or an intermediate component may be therebetween. On the other hand, when a first component is referred to as being "directly connected" or "directly coupled" to a second component, there is no intermediate component therebetween.

Terminology used in this specification is used only for describing specific embodiments and is not intended to limit the present invention. The singular forms include the plural forms as well unless the context clearly indicates otherwise. In this specification, the terms "comprise," "comprising," "include," "including," "have," "having," and the like indicate the presence of features, integers, steps, operations, components, parts, or combinations thereof stated herein and do not preclude the possibility of presence or addition of one or more other features, integers, steps, operations, components, parts, or combinations thereof.

Unless otherwise defined, all terms including technical or scientific terms used herein have the same meaning as generally understood by those of ordinary skill in the art. Terms defined in generally used dictionaries are construed as having the same meaning as would be construed in the context of the related art. Unless defined clearly in this specification, the terms are not interpreted in an ideal or excessively formal sense.

Some embodiments may be represented by functional blocks and various processing operations. All or some of the functional blocks may be implemented by various hardware and/or software elements that perform specific functions. For example, functional blocks of the present disclosure may be implemented by one or more processors or microprocessors or circuit elements for performing intended functions. Also, for example, functional blocks of the present disclosure may be implemented in various programming or scripting languages. The functional blocks may be implemented as algorithms that are executed on one or more processors. The present disclosure may employ the related art for electronic environment settings, signal processing, data processing, and/or the like. The terms "module," "element," and the like may be used in a broad sense and are not limited to mechanical and physical elements.

Hereinafter exemplary embodiments of the present invention will be described in detail with reference to the accompanying drawings. Throughout the drawings, like reference numerals refer to like components, and duplicate descriptions thereof will be omitted.

Figure 2:
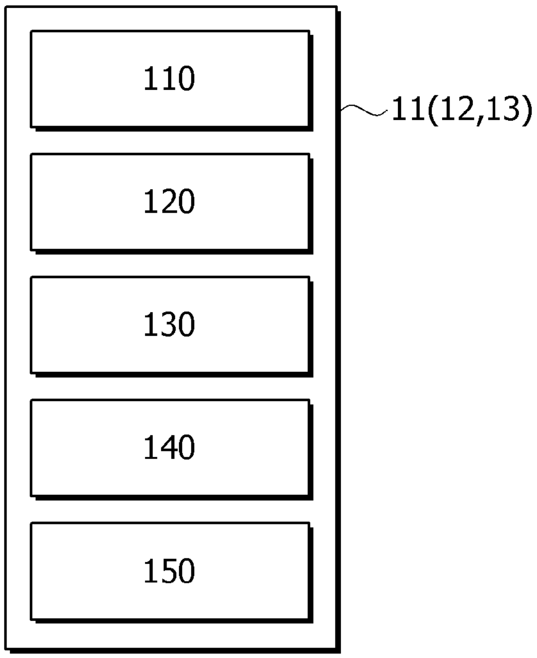
FIG. 2 is a block diagram of a distributed device that is a node in the key management system according to the exemplary embodiment.
Figure 3:
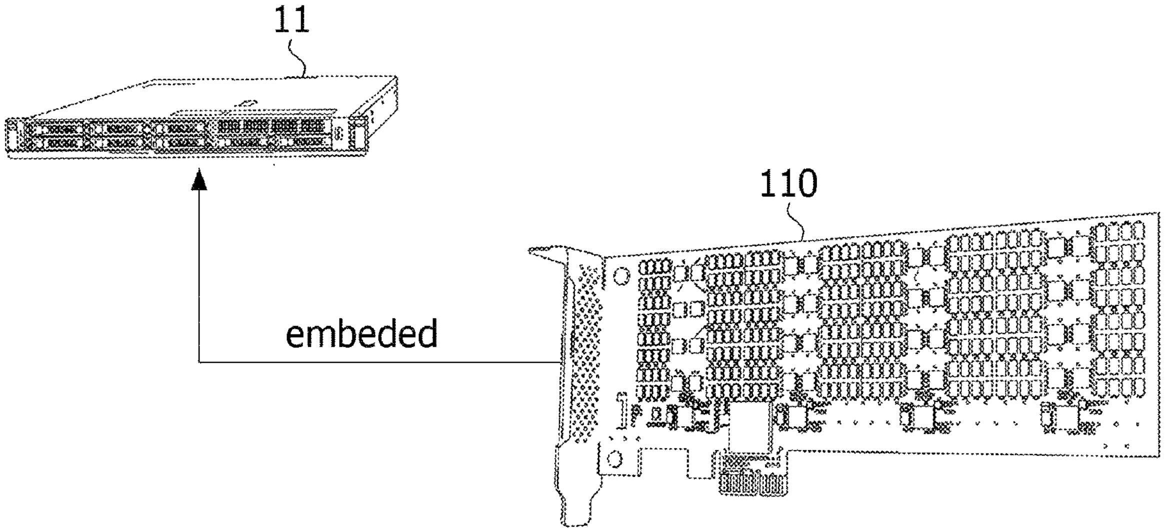
FIG. 3 is a view of a hardware security device embedded in a distributed device in the key management system according to the exemplary embodiment.
Figure 4:
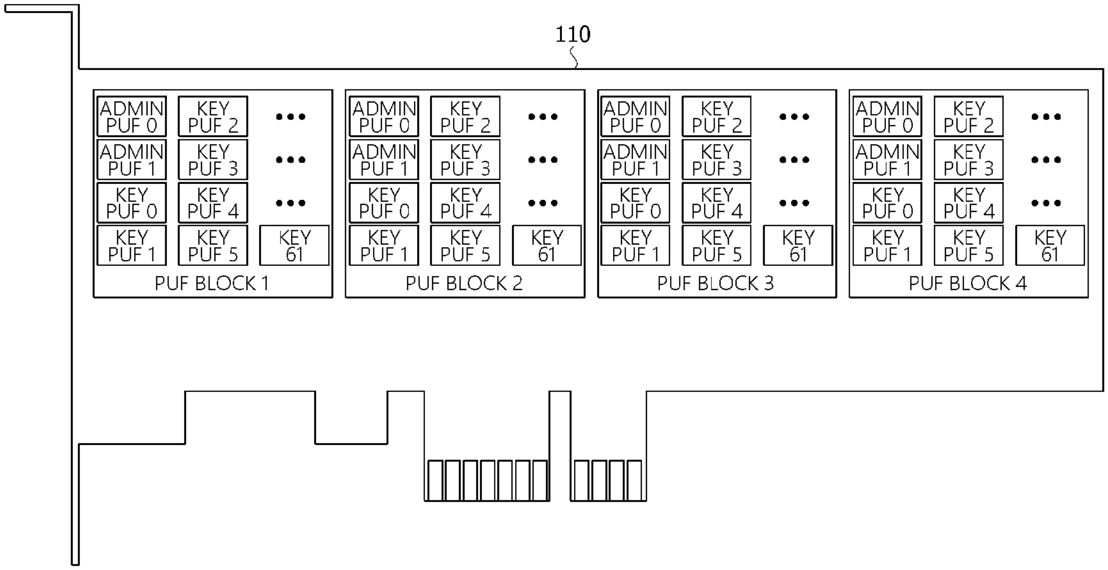
FIG. 4 is a diagram of a hardware security device of a distributed device in the key management system according to the exemplary embodiment.

FIG. 1 is a conceptual diagram of a key management system according to an exemplary embodiment. FIG. 2 is a block diagram of a distributed device that is a node in the key management system according to the exemplary embodiment. FIG. 3 is a view of a hardware security device embedded in a distributed device in the key management system according to the exemplary embodiment. FIG. 4 is a diagram of a hardware security device of a distributed device in the key management system according to the exemplary embodiment.

Referring to FIG. 1, a key management system 10 according to the exemplary embodiment may include a plurality of nodes. The plurality of nodes may constitute a blockchain network. In the present invention, the key management system 10 is of a distributed type and may be referred to as a "distributed key management system."

The blockchain network may be a system that performs a necessary transaction and computing process using the computing capability of the plurality of blockchain nodes. As described above, the blockchain network may include the plurality of nodes or blockchain nodes 11, 12, and 13. The plurality of nodes may include the first to third nodes 11 to 13 (or first to third distributed devices). However, the number of nodes is not limited thereto.

Nodes may be referred to as a "server," a "distributed device," a "key management server," a "key management device," a "blockchain node," and the like. The term "node" will be interchangeably used with these terms below.

The distributed devices 11, 12, and 13 may constitute the blockchain network having a peer-to-peer (P2P) structure and operate according to a blockchain protocol.

Also, the distributed devices 11, 12, and 13 may share various smart contracts and transaction data through the blockchain network and ensure the integrity and security of a transaction through a consensus process.

Further, the distributed devices 11, 12, and 13 may request a key for an encryption-demanding service from each other (key request), and the distributed devices receiving the request may transmit a generated key to the distributed devices requesting the key as a response key (key response). Here, the encryption-demanding service or the service in which encryption is required may involve a database or the like in which personal information is encrypted and stored.

Since each distributed device constitutes the blockchain network, one distributed device may request a key from other nodes or distributed devices connected through the blockchain network. Also, the distributed devices connected through the blockchain network share all data and thus may transmit a response to the key request to the node requesting a key. When the integrity of the response key is verified by a vote of the distributed devices or nodes, the response key may be registered and generated in the blockchain network. Then, the encryption-demanding service may be encrypted on the basis of the response key.

A center node or center distributed device may mainly respond to a request. However, the present invention is not limited thereto, and each node in the key management system may operate as a center node or center distribution node. Accordingly, the problem of being vulnerable to attacks due to centralization can be solved.

For example, the plurality of distributed devices may include the first distributed device 11, the second distributed device 12, and the third distributed device 13. The first distributed device 11, the second distributed device 12, and the third distributed device 13 may request a key from each other and transmit a response key to each other in response to the request. Here, the first distributed device 11 may be a center distributed device. The first distributed device 11 may be a key management server as the center distributed device.

According to an exemplary embodiment, among the first distributed device 11, the second distributed device 12, and the third distributed device 13 constituting the blockchain network, the first distributed device 11 may receive a service requesting encryption from another distributed device (e.g., the third distributed device 13). In this case, the first distributed device 11 may request a physically unclonable function (PUF)-based key from one distributed device. For example, the first distributed device 11 may request a PUF-based key from the second distributed device 12.

Then, the second distributed device 12 may generate a response key corresponding to the requested key. The response key may be a PUF-based key. The second distributed device 12 may share the key in the blockchain network.

Also, when the integrity of the response key is verified in the blockchain network, the response key may be registered in the blockchain network.

According to an exemplary embodiment of the present invention, the foregoing PUF may provide an unpredictable digital value. Even when individual PUFs are accurately manufactured in the same manufacturing process, digital values provided by the PUFs may be different due to process variations. Accordingly, a PUF may also be referred to as a "physical one-way function (POWF) practically impossible to duplicate." Such a PUF may be used to generate an authentication key for security, communication, and/or device authentication. As an example, a PUF may be used to provide a unique key for distinguishing devices from one another or communication between devices or a device and a server. A PUF may be used to generate an authentication key for security, communication, and/or device authentication. A PUF and a method of implementing the same are disclosed in Korean Patent No. 10-1139630, the disclosure of which is incorporated herein by reference.

There are several embodiments of implementing a PUF. As an example, a PUF may be implemented using a process variation of a semiconductor manufacturing process as described above. Specifically, a PUF according to an exemplary embodiment may be implemented by vias or inter-layer contacts disposed between conductive layers.

Also, a PUF may be implemented in a part of a semiconductor. Accordingly, it may be difficult to identify the accurate location of a PUF through external observation. In other words, since there are a huge number of vias or inter-layer contacts in a semiconductor circuit, it is difficult to determine which part is used as a PUF, which is a favorable security effect. According to an exemplary embodiment, a plurality of PUFs rather than one PUF may provide a key. A key generated on the basis of such PUFs serves as an authentication key or master key in the blockchain network, thus enhancing security.

Further, when each of the distributed devices 11, 12, and 13 participates in the blockchain network, the distributed device may authenticate its identity to verify that the distributed device is a valid node. To this end, each of the distributed devices 11, 12, and 13 may be issued a key and certificate for identity authentication by the center distributed device or another distributed device, and the key and certificate may be collected and stored in a hardware security device of the center distributed device. When identity authentication is necessary, each distributed device may request the key and certificate from the center distributed device, and the center distributed device may read the key and certificate from the hardware security device, decrypt the key and certificate, and then provide the decrypted key and certificate to the requesting distributed device. In this way, the foregoing encryption-demanding service can be provided through key requests and key responses between the distributed devices 11, 12, and 13.

According to an exemplary embodiment, the hardware security device may include a storage medium with enhanced security such as a hardware security module (HSM).

Also, the center distributed device may be any one (e.g., the first node) of the distributed devices 11, 12, and 13, but is not limited thereto. Further, each distributed device has a key management module and a hardware security device so that the key and certificate may not be managed by a single node or single distributed device. In addition, each of the distributed devices 11, 12, and 13 stores and manages the key and certificate and share data through the blockchain network. In this way, there may be no necessity for a centralized key management system or a security medium for collecting and storing a key. Therefore, even when there is a single point of failure, the entire blockchain network can operate normally regardless of the point of failure. That is, even when a specific node is attacked or down, operations of the entire blockchain network are not affected, and blockchain services can be stably provided.

In other words, it is possible to easily solve problems caused by centralized storage and management of keys, certificates, and the like on a single server or node (an entire network paralyzed by a single point of failure, a security issue of all keys and certificates of a blockchain network being leaked by only a hacking attack, and the like). In brief, the distributed device and key management system according to the exemplary embodiment can remarkably improve security and management efficiency.

Additionally referring to FIGS. 2 to 4, in the key management system according to the exemplary embodiment, each of the distributed devices 11, 12, and 13 may include a hardware security device 110, a key management module 120, a blockchain client 130, a communicator 140, and a monitoring part 150.

The hardware security device 110 may include an HSM. The hardware security device 110 may have a plurality of public and secret key (private key) pairs. Also, public and secret key pairs in the hardware security device 110 may be unique, that is, not identical to each other. Also, to prove the validity of a key pair, the hardware security device 110 may sign the key pair with a master key or the like and issue the key pair. The hardware security device 110 or the key management module 120 may manage the master key for encrypting data.

When a key request is received by the distributed device, the hardware security device 110 may generate a key corresponding to the key request. In other words, the hardware security device 110 may generate or issue a key pair.

According to the exemplary embodiment, the hardware security device 110 may include a PUF module including PUFs. The hardware security device 110 may generate the foregoing key (or key pair) through the PUF module.

The PUF module may be a PUF chip array. For example, the PUF module may include a plurality of PUFs or PUF chips. For example, the PUF module may have about 256 PUF chips. The PUF chips may be root-of-trust (ROT) chips in which PUFs are embedded. The PUF chips may generate asymmetric keys (a private key and a public key). For example, one PUF chip may generate an asymmetric key. Accordingly, the PUF module may generate a plurality of asymmetric keys. Also, the PUF module may generate keys at a high rate through the plurality of PUF chips.

The PUF module or the hardware security device 110 may communicate with a server or personal computer (PC) through an interface. For example, the interface may include a peripheral component interconnect (PCI) interface. As shown in FIGS. 3 and 4, the PUF module in the distributed device or the hardware security device 110 may be a PCI module in which a plurality of PUF chips are mounted. In other words, the hardware security device 110 may include the PCI interface. Accordingly, compatibility with various servers or PCs can be improved. When the hardware security device 110, which is the HSM, and the key management module 120 are installed in the distributed device, the distributed device which is one server or node may serve as an HSM/key management system (KMS). The single chip (ex. PUF chip) may be referred to as an "embedded HSM (eHSM)."

The PUF module on which the PUF chips are mounted according to the exemplary embodiment may have a plurality of blocks and a plurality of PUF chips in each block. Also, in the hardware security device 110, each PUF may include an encryption/decryption engine for generating an asymmetric key.

According to the exemplary embodiment, one block or one chip (PUF chip) may store a master key. According to the exemplary embodiment, at least some of the plurality of PUFs may generate a master key. In other words, a key may be generated through one block or one chip (PUF chip). With this configuration, it is possible to connect servers (nodes), which have an interface for interfacing with the hardware security device 110, to each other at various locations and establish a communication channel through key transmission. For example, servers may be disposed in a plurality of community centers, a plurality of public libraries, a plurality of public firms, and the like to implement a decentralized key management system with enhanced security.

The key management module 120 may manage the key generated or issued by the hardware security device 110. The key management module 120 may be a KMS. The key management module 120 may interoperate with the hardware security device 110 to manage the lifecycle of the key. For example, the key management module 120 may generate, store, use, and destroy the key. Also, the key management module 120 may control access to the key, record a log of the key, and monitor the security of the key. The key management module 120 may provide the generated key for an encryption-demanding service or to a server, a node, or a distributed device that requests the encryption-demanding service. The encryption-demanding service or the node (server or distributed device) that requests the encryption-demanding service may use at least some keys (e.g., a response key), which are generated by the PUF module or the like, to communicate with another node or a node generating a response key. In the case of an asymmetric key, secured communication may employ transport layer security (TLS), datagram transport layer security (DTLS), or the like. For example, a TLS certificate may be generated using at least one of the plurality of security chips (PUF chips), and secured communication may be performed using the TLS certificate.

When a duplicate key is generated by the hardware security device 110, the key management module 120 may delete the duplicate key. Accordingly, the security can be enhanced.

Also, the key management module 120 itself may serve as an encryptor or decryptor. In other words, the key management module 120 may perform encryption and decryption.

The blockchain client 130 may receive the generated key from the key management module 120 or the hardware security device 110 and share the generated key in the blockchain or blockchain network.

The communicator 140 may support various communication methods other than Internet communication. To this end, a communication interface may include communication modules that are well known in the technical field of the present invention.

Communication may be performed between the distributed device and another distributed device or a monitoring server to be described below. For example, the blockchain network may be formed by the communicator 140.

The monitoring part 150 may manage information about whether another device (distributed device) in the blockchain network malfunctions. In this way, one distributed device or the like can provide a key request for an encryption-demanding service to a normal distributed device (distributed device not out of order). With this configuration, it is possible to easily prevent the entire network from being paralyzed by a single point of failure, and a key request and a key response can be made smoothly.

Further, the distributed device may include a storage (not shown). The storage (not shown) may store information on the generated key and information or data processed through the blockchain network. The storage (not shown) may non-temporarily store one or more computer programs. The storage (not shown) may include a non-volatile memory, such as a read-only memory (ROM), an erasable programmable ROM (EPROM), an electrically erasable programmable ROM (EEPROM), a flash memory, or the like, a hard disk drive (HDD), a detachable disk, or any type of computer-readable recording medium well known in the technical field of the present invention.

Detailed operations of each component in a single node or single distributed device will be described below.

Figure 5:
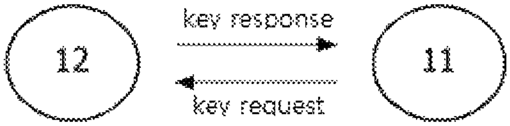
FIG. 5 is a diagram illustrating operations between nodes (distributed devices) in the key management system according to the exemplary embodiment.
Figure 6:
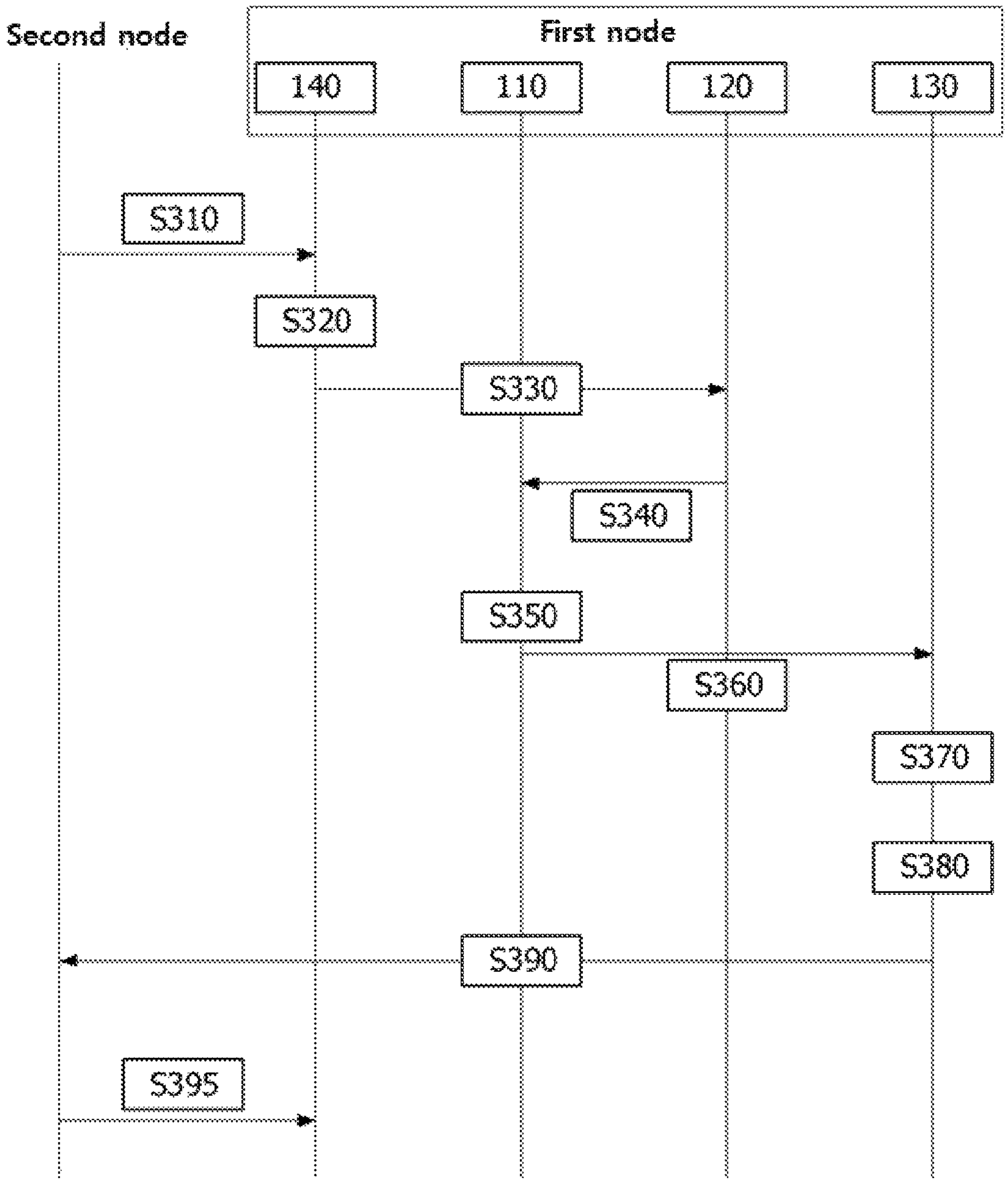
FIG. 6 is a sequence diagram illustrating operations between nodes (distributed devices) in the key management system according to the exemplary embodiment.
Figure 7:
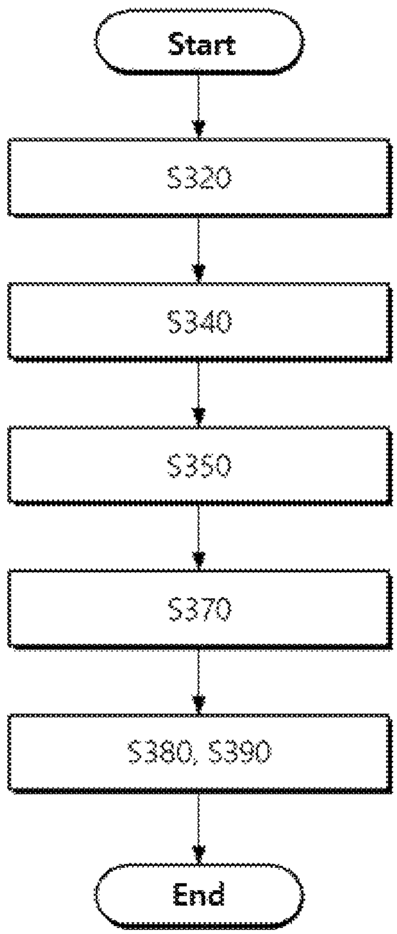
FIG. 7 is a flowchart illustrating operations between nodes (distributed devices) in the key management system according to the exemplary embodiment.

FIG. 5 is a diagram illustrating operations between nodes (distributed devices) in the key management system according to the exemplary embodiment. FIG. 6 is a sequence diagram illustrating operations between nodes (distributed devices) in the key management system according to the exemplary embodiment. FIG. 7 is a flowchart illustrating operations between nodes (distributed devices) in the key management system according to the exemplary embodiment.

Referring to FIGS. 5 to 7, a key management method may be performed between distributed devices through each of the following operations.

More specifically, in the key management method, a key request and a key response may be made between a plurality of nodes or distributed devices. For example, when the second distributed device 12 receives an encryption-demanding service from another node or distributed device, the second distributed device 12 may provide a key request for encryption to the first node 11 (S310). In other words, the second node 12 may transmit the key request to the first node 11 (S310).

The first node 11 may receive the key request (S320). Specifically, the communicator 140 of the first node 11 may receive the key request for the encryption-demanding service (S320).

The first node 11 (or the communicator 140) may transmit the key request for the encryption-demanding service to the key management module 120 or the hardware security device 110 (S330).

According to the exemplary embodiment, the key management module 120 in the first node 11 may request a PUF-based key from the hardware security device 110 (S340).

In other words, the hardware security device 110 may receive the request for PUF-based key generation and generate a response key (S350). The response key may be issued or generated by the PUF module or a PUF chip of the hardware security device 110.

Then, the hardware security device 110 may transmit the generated response key to the key management module or the blockchain client 130 (S360).

Before transmitting the response key generated by the hardware security device 110 to the second node 12 (or the node having transmitted the key request), the blockchain client 130 may share the response key in the blockchain network (S370). When the integrity of the shared response key is verified in the blockchain network, the response key may be registered in the blockchain network. The blockchain client 130 may receive whether the response key has integrity from the blockchain network (S380). When the integrity is verified, the blockchain client 130 may transmit the response key (S390). In other words, according to the exemplary embodiment, when the encryption-demanding service is received, the first node 11 may provide the generated key as a response key to the device (the second node 12) having transmitted the encryption-demanding service (S390). The blockchain client 130 may provide the response key to the second node 12 having requested the key or the device from which the encryption-demanding service has been received, through the communicator 140. Due to the blockchain client 130, the hardware security device 110 or the key management module 120 may provide the response key to the second node 12 having requested the key through the communicator 140. Subsequently, the second node 12 may establish a communication channel with the first node 11 or a node from which the encryption-demanding service has been requested and transmit a response to channel establishment (S395). For example, the communicator 140 may perform secured communication or establish a channel with another node or another device on the basis of the response key.

Figure 8:
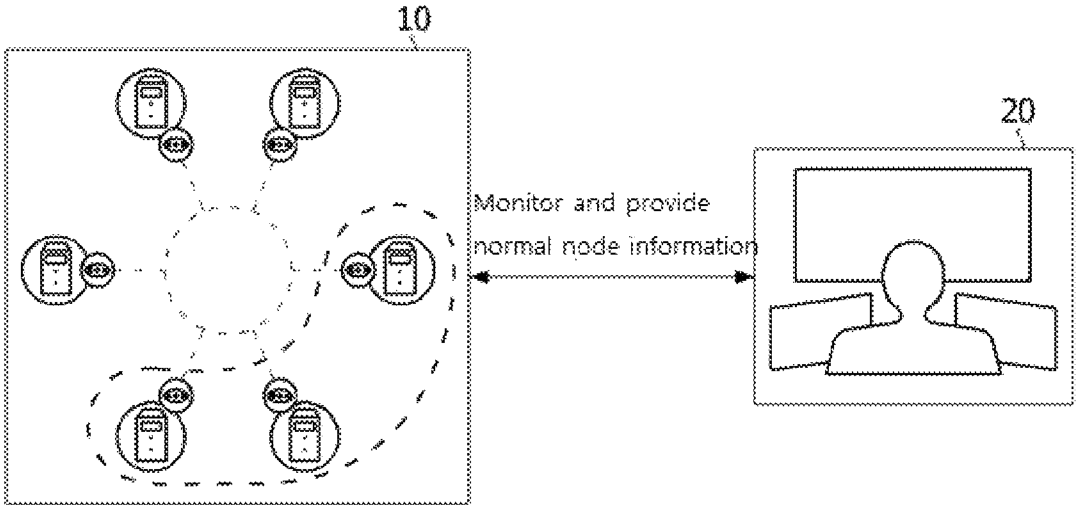
FIG. 8 is a conceptual diagram of a key management system according to another exemplary embodiment.
Figure 9:
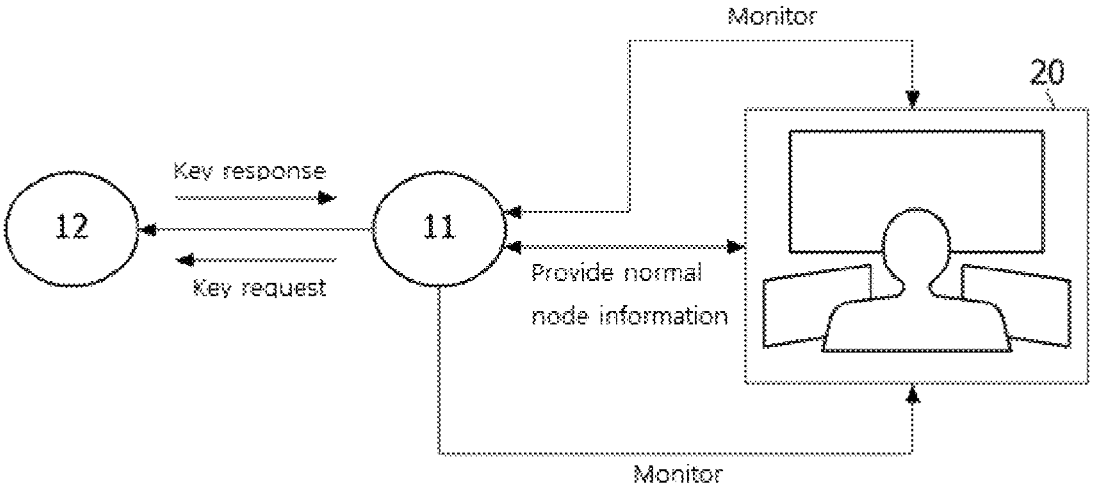
FIG. 9 is a diagram illustrating operations between a monitoring server and each node in the key management system according to the other exemplary embodiment.

FIG. 8 is a conceptual diagram of a key management system according to another exemplary embodiment, and FIG. 9 is a diagram illustrating operations between a monitoring server and each node in the key management system according to the other exemplary embodiment.

Referring to FIGS. 8 and 9, the key management system according to the exemplary embodiment may include a plurality of distributed devices constituting a blockchain network (the system 10 of FIG. 1) and a monitoring server 20.

The above descriptions of each distributed device, each node, a blockchain network, and the like other than the following description may apply to this embodiment.

For example, the plurality of nodes or distributed devices may include, for example, a first distributed device 11 and a second distributed device 12.

The monitoring server 20 may monitor all of a plurality of nodes, for example, the first distributed device 11 and the second distributed device 12. The monitoring server 20 may interoperate with the monitoring part 150 of each distributed device (each node or server) to check a favorable state or normal state of the node (the distributed device or server). For example, the monitoring server 20 may receive information on the state of each server from each node. Accordingly, the monitoring server 20 is aware of normal nodes (servers or distributed devices) and thus may transmit information on the normal nodes to a node (or distributed device) that has received an encryption-demanding service. According to this exemplary embodiment, the monitoring server 20 may have information on a normal distributed device between the first distributed device 11 and the second distributed device 12 and provide the information to a distributed device (e.g., the first distributed device) having received an encryption-demanding service. The normal distributed device (e.g., the second distributed device) may generate a PUF-based response key corresponding to a key request for the encryption-demanding service from the first distributed device 11. Then, the second distributed device 12 which is the normal distributed device may provide the response key to the first distributed device having received the encryption-demanding service.

In the key management system according to this exemplary embodiment, the state of each node (server or distributed device) is recognized through the monitoring server 20, and thus it is possible to rapidly and accurately request a key for an encryption-demanding service from a normal node (server or distributed device) without any problem. Also, when there are a plurality of normal nodes without any problem, one of the normal nodes is randomly selected, which further enhances security.

As a modified example, without the monitoring server 20, a key request may be made to each node (server or distributed device) in a round robin (RR) manner with a certain timeout. In other words, a key request may be sequentially assigned to each node (server or distributed device) in time units (time quanta/slices) without priority.

The key management methods of a distributed device according to the disclosed embodiments may be implemented in the form of program instructions that are executable by various computing devices, and recorded on a computer-readable recording medium. Also, an embodiment of the present disclosure may be a computer-readable recording medium on which one or more programs including instructions for implementing the key management method of a distributed device are recorded.

The computer-readable recording medium may include program instructions, data files, data structures, and the like solely or in combination. The program instructions recorded on the medium may be those specially designed and constructed for the present invention or well known and available to those skilled in the computer software field. Examples of the computer-readable recording medium include magnetic media such as an HDD, a floppy disk, and magnetic tape, optical media such as a compact disc (CD)-ROM and a digital versatile disc (DVD), magneto-optical media such as a floptical disk, and hardware devices specially configured to store and execute the program instructions such as a ROM, a random access memory (RAM), a flash memory, and the like. Examples of the program instructions include not only machine code produced by a compiler but also high-level language code that is executable by a computer using an interpreter or the like.

A machine-readable storage medium may be provided in the form of a non-transitory storage medium. Here, the term "non-transitory" means that the storage medium does not include a signal (e.g., electromagnetic waves) and is tangible, but does not distinguish whether data is permanently or temporarily stored in the storage medium. For example, a "non-transitory storage medium" may include a buffer in which data is temporarily stored.

The key management methods of a distributed device according to the various embodiments disclosed herein may be provided in a computer program product. The computer program product may be traded between a seller and a purchaser as a commodity. The computer program product may be distributed in the form of a machine-readable storage medium (e.g., a CD-ROM) or distributed online (e.g., downloaded or uploaded) directly between two user devices (e.g., smartphones) through an application store (e.g., Play-Store™). In the case of online distribution, at least a portion of the computer program product may be stored at least temporarily or temporarily in a storage medium such as a memory of a manufacturer's server, an application store's server, or a relay server.

Specifically, the key management methods of a distributed device according to the disclosed embodiments may be provided as a computer program product including a recording medium on which a program for implementing the methods is recorded.

Although exemplary embodiments have been described in detail above, the scope of the present invention is not limited thereto, and various modifications and alterations made by those skilled in the art from the spirit of the present invention defined in the following claims also fall within the scope of the present invention.

As used herein, the term "part" refers to a software or hardware component, such as a field-programmable gate array (FPGA) or application-specific integrated circuit (ASIC), which performs certain roles. However, the term "part" is not meant to be limited to software or hardware. A "part" may be included in an addressable storage medium or configured to operate one or more processors. Therefore, according to an embodiment, a "part" includes components, such as software components, object-oriented software components, class components, and task components, processes, functions, attributes, procedures, subroutines, segments of program code, drivers, firmware, microcode, circuitry, data, databases, data structures, tables, arrays, and variables. Functionality provided in components and "parts" may be combined into fewer components and "parts" or may be further subdivided into additional components and "parts." In addition, components and "parts" may be implemented to operate one or more central processing units (CPUs) in a device or secure multimedia card.

According to embodiments, it is possible to implement a distributed device and key management system that are not in a structure in which a master key, an HSM, and a KMS are present in only one system or a single node but in a structure in which each node or distributed device has a blockchain client while performing an HSM/KMS function and thus constitute a blockchain while serving as an independent node.

According to embodiments, it is also possible to implement a distributed device and key management system in which nodes are connected to each other through an interface (e.g., a PCI interface) and also protection from attacks is enhanced with security based on a PUF chip and secured connections such as TLS connections or DTLS connections.

According to embodiments, it is also possible to implement an inexpensive and highly reliable distributed device and key management system which do not cause independent nodes or distributed devices to operate in a centralized manner, allow an entire cryptographic system to keep operating even when one node is attacked or out of order, and thus lower the risk from one hacked node.

Various advantages and effects of the present invention are not limited to those described above and may be easily understood from the above process of describing specific embodiments of the present invention.

Although exemplary embodiments of the present invention have been mainly described, these are merely illustrative and do not limit the present invention, and those of ordinary skill in the art should know that various modifications and applications not illustrated above can be made without departing from the essential characteristics of the exemplary embodiments. For example, each component specified in an embodiment can be implemented in a modified form. In addition, differences of the modifications and applications are construed as falling within the scope of the present invention defined in the following claims.

What is claimed is:

1. A distributed device comprising:

a hardware security device configured to generate a key;

a key management module configured to manage the generated key; and a blockchain client configured to receive the generated key from the key management module and share the generated key in a blockchain network, wherein the hardware security device includes a physically unclonable function (PUF) module including a PUF, wherein the generated key is generated by the PUF module, wherein the distributed device independently performs hardware security module (HSM) and key management system (KMS) functions without relying on a centralized key management system, and operates as an independent node that constitutes the blockchain network together with other distributed devices.

2. The distributed device of claim 1, wherein the PUF includes an encryption/decryption engine configured to generate an asymmetric key, and the PUF module includes a plurality of PUFs.

3. The distributed device of claim 2, wherein at least some of the plurality of PUFs generate a master key.

4. The distributed device of claim 3, wherein the hardware security device manages the master key for encrypting data.

5. The distributed device of claim 1, wherein the hardware security device generates a PUF-based key for an encryption-demanding service as a response key.

6. The distributed device of claim 5, wherein the blockchain client shares the response key in the blockchain network.

7. The distributed device of claim 5, wherein the response key is registered in the blockchain network when integrity is verified in the blockchain network.

8. The distributed device of claim 5, wherein the blockchain client provides the response key to a device that receives the encryption-demanding service.

9. The distributed device of claim 5, further comprising a communicator configured to perform secured communication with another device on the basis of the response key.

10. The distributed device of claim 1, wherein the key management module performs encryption and decryption.

11. The distributed device of claim 1, wherein, when a duplicate key is generated by the hardware security device, the key management module deletes the duplicate key.

12. The distributed device of claim 1, further comprising a monitoring part configured to manage whether another device in the blockchain network malfunctions.

13. The distributed device of claim 1, wherein the hardware security device is configured to generate a PUF-based response key in response to a key request received from another distributed device in the blockchain network for an encryption-demanding service.

14. A distributed key management system comprising a first distributed device and a second distributed device included in a blockchain network, wherein each of the first distributed device and the second distributed device independently performs hardware security module (HSM) and key management system (KMS) functions without relying on a centralized key management system, and operates as an independent node that constitutes the blockchain network, wherein each of the first distributed device and the second distributed device includes a hardware security device having a physically unclonable function (PUF) module configured to generate a PUF-based key, and wherein, when an encryption-demanding service is received, the second distributed device requests a PUF-based key from the first distributed device, and the first distributed device generates the PUF-based key using the PUF module of the first distributed device in response to the request.

15. The distributed key management system of claim 14, wherein the first distributed device generates a response key corresponding to the requested key and shares the response key in the blockchain network.

16. The distributed key management system of claim 15, wherein the response key is registered in the blockchain network when integrity is verified in the blockchain network.

17. The distributed key management system of claim 14, wherein each of the first distributed device and the second distributed device further comprises:

a key management module configured to manage the generated key; and a blockchain client configured to receive the generated key from the key management module and share the generated key in the blockchain network.

18. A distributed key management system comprising:

a first distributed device and a second distributed device included in a blockchain network; and a monitoring server configured to monitor the first distributed device and the second distributed device, wherein the monitoring server provides information on a normal one of the first distributed device and the second distributed device to a distributed device that receives an encryption-demanding service, wherein each of the first distributed device and the second distributed device includes:

a hardware security device having a physically unclonable function (PUF) module configured to generate a PUF-based key;

a key management module configured to manage the generated key; and a blockchain client configured to share the generated key in the blockchain network, wherein each of the first distributed device and the second distributed device independently performs hardware security module (HSM) and key management system (KMS) functions without relying on a centralized key management system, and operates as an independent node that constitutes the blockchain network.

19. The distributed key management system of claim 18, wherein the normal distributed device generates a PUF-based response key corresponding to a key request for the encryption-demanding service.

20. The distributed key management system of claim 19, wherein the normal distributed device provides the response key to the distributed device that receives the encryption-demanding service.

* * * * *